United States Patent [19]

Schierling

[11] Patent Number: 5,086,892
[45] Date of Patent: Feb. 11, 1992

[54] HYDRODYNAMIC TORQUE CONVERTER

[75] Inventor: Bernhard Schierling, Kürnach, Fed. Rep. of Germany

[73] Assignee: Fichtel & Sachs AG, Schweinfurt, Fed. Rep. of Germany

[21] Appl. No.: 614,507

[22] Filed: Nov. 16, 1990

[30] Foreign Application Priority Data

Nov. 23, 1989 [DE] Fed. Rep. of Germany ....... 3938724

[51] Int. Cl.⁵ ............................................. F16D 33/00
[52] U.S. Cl. .................................. 192/3.29; 192/3.25; 192/3.31
[58] Field of Search ..................... 192/3.21, 3.25, 3.28, 192/3.29, 3.31; 60/338

[56] References Cited

U.S. PATENT DOCUMENTS

| 4,972,736 | 11/1990 | Koshimo | 192/3.31 X |
| 4,989,702 | 2/1991 | Yoshimura et al. | 192/3.31 X |
| 5,014,834 | 5/1991 | Suzuki et al. | 192/3.31 X |

FOREIGN PATENT DOCUMENTS

| 3614158 | 10/1987 | Fed. Rep. of Germany . | |
| 803444 | 10/1958 | United Kingdom | 192/3.25 |

Primary Examiner—Leslie A. Braun
Assistant Examiner—Andrea Pitts
Attorney, Agent, or Firm—Toren, McGeady & Associates

[57] ABSTRACT

The invention relates to a hydrodynamic torque convertor with a bridging coupling and a torsion spring arrangement. In the power path behind the torsion spring arrangement there is an auxiliary gyratory mass which makes it possible to reduce the vibration-related balancing-out process to a very low speed level.

12 Claims, 3 Drawing Sheets

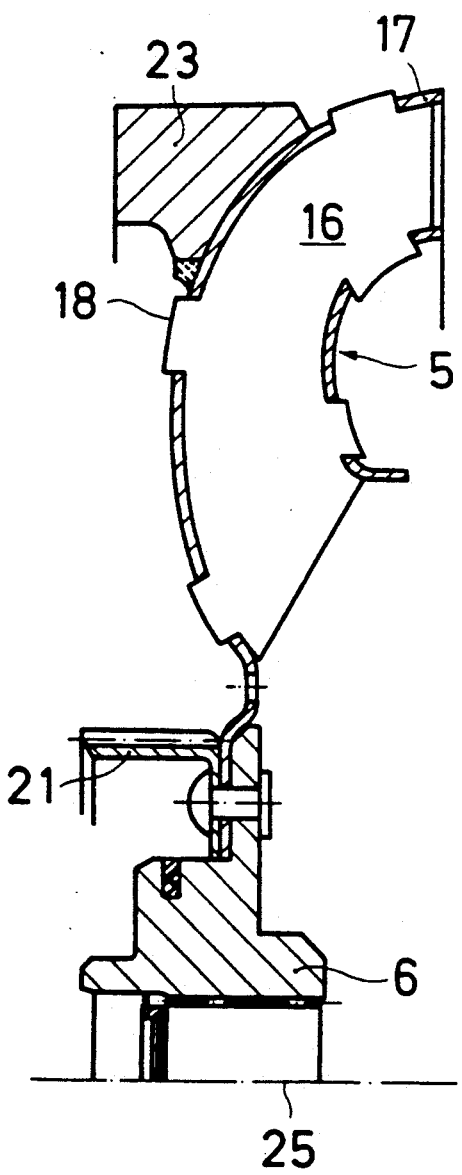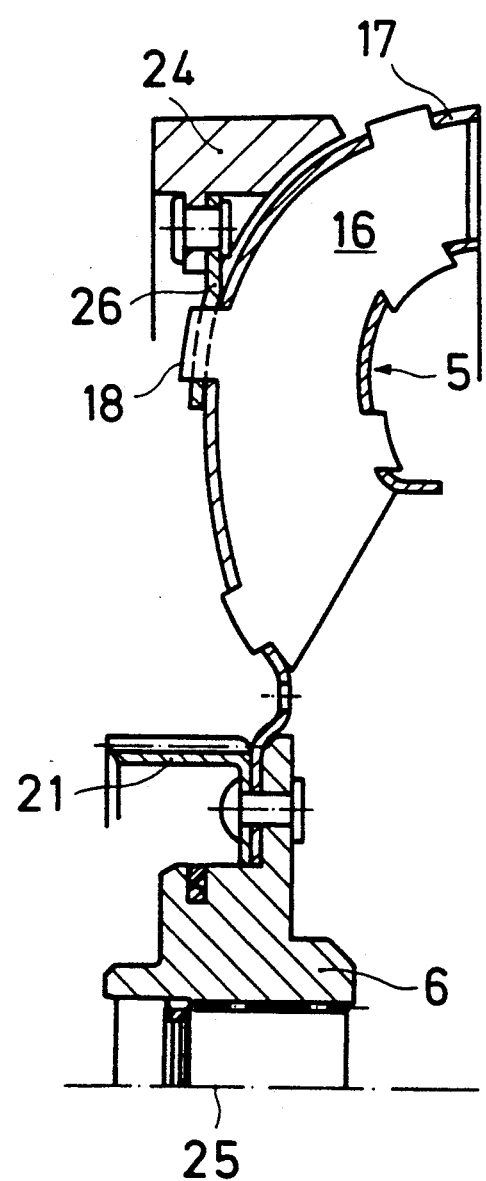

HYDRODYNAMIC TORQUE CONVERTER

BACKGROUND OF THE INVENTION

The invention relates to a hydrodynamic torque convertor with a bridging coupling.

Known from DE-A-3614158 is a torque convertor comprising a substantially pot-shaped housing which is adapted to be driven at the bottom end and which is at the opposite end connected to a pump wheel. A turbine wheel is disposed between the bottom and the pump wheel and is mounted on a gear shaft through a hub. A bridging coupling is disposed between the turbine wheel and the bottom of the housing and comprises the piston which can be applied against the inside face of the bottom and which forms a friction surface therewith. In the applied state, the piston transmits the torque from the housing to the gear shaft through a torsion spring arrangement.

For damping torsion vibrations in the bridged condition the known torque converter comprises a torsion spring arrangement and possibly friction means. This balancing out of torsion vibrations from the internal combustion engine extends downwards substantially to rotary speeds of 1700...1900 rpm. Since internal combustion engines are increasingly available whose full torque potential extends downwards as far as substantially lower rotary speeds, it must be ensured that adequate balancing-out also takes place in this lower speed range.

SUMMARY OF THE INVENTION

The present invention is directed to provide a torque converter having a bridging coupling, and to achieve a damping of torsion vibrations which permits of comfortable travel even at very low speeds of a motor vehicle.

By disposing an auxiliary gyratory mass on the output side of the torsion spring arrangement, the mass moment of inertia on the secondary side is increased so that even with a high loading, markedly lower rotary speeds can be used without sacrificing comfort. Only minimal technical complication is needed to achieve this.

It is advantageous for the springs of the torsion spring arrangement to be disposed on a medium or small diameter while the auxiliary gyratory mass is disposed on a larger diameter. Thus, a considerable mass moment of inertia can be realized with relatively little weight.

In a particularly advantageous manner, the auxiliary gyratory mass can be disposed in the—in axial longitudinal section—triangular annular space between the convex contours of the turbine wheel shell, the cylindrical contours of the housing and the piston of the bridging coupling.

A particularly simple embodiment can be achieved by mounting the auxiliary gyratory mass directly on the turbine wheel.

In the case of a turbine wheel which is made from sheet metal, the auxiliary gyratory mass can be welded directly onto the sheet metal shell. However, it is also possible to mount it by means of retaining elements which are riveted onto the turbine wheel. The retaining elements can thereby be constructed as simple shaped sheet metal parts.

When sheet metal blades are used which are riveted in the sheet metal shell of the turbine wheel via integrally provided rivet extension pieces, the retaining elements can advantageously be traversed by and riveted to the same rivet extension pieces. Thus, a separate type of fixing is unnecessary.

It may however also be advantageous to mount the auxiliary gyratory mass directly on the output part of the torsion spring arrangement. In the case of a disposition of side plates provided on both sides of a hub disc and which, at their outer periphery, are rotationally rigidly mounted on the piston, transmitting the torque through springs in the form of coil springs rotationally rigidly connected by teeth to the turbine wheel hub radially within the coil springs, it is advantageous for the hub disc to be provided radially outwardly with arms which pass through corresponding cut-outs in one or both side plates, are peripherally offset in respect of the fixing zones of the side plates and which are connected to the auxiliary gyratory mass. In this way, this latter is fixed directly on a component which is, seen in the direction of power flow, disposed behind the torsion spring arrangement. The advantageous position of the auxiliary gyratory mass is not altered in consequence, since it is likewise disposed on a large diameter.

The auxiliary gyratory mass is advantageously constructed as a closed ring—with a cylindrical outer contour and a contour which is adapted to the convex form of the turbine wheel shell.

If the turbine wheel is constructed as a casting, it is advantageous for the auxiliary gyratory mass also to be made of cast material and to be cast directly onto the turbine wheel. Such a construction entails quite minimal production costs.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIGS. 4 and 5 are partial longitudinal sections through a turbine wheel with hub and auxiliary gyratory mass.

FIG. 1 shows the upper half of an axial section through a hydrodynamic torque convertor 1 which in known manner comprises a pump wheel 4, a turbine wheel 5 and an impeller 32. The pump wheel 4 is connected to a housing part 3 which is substantially pot-shaped, and which has a bottom wall 29 and a side wall 30 which extends substantially cylindrically and merges into the pump wheel 4. The bottom wall 29 is in a manner not shown in greater detail rotationally rigidly connected to the crank shaft of an internal combustion engine. The housing part 3 together with the pump wheel 4 forms one fluid-tight unit which at least partly contains a transmission fluid. The turbine wheel 5 is mounted by means of a hub 6 on a gear shaft, not shown, to which it is rotationally rigidly connected. In the present case, the torque convertor 1 is composed of sheet metal parts. The pump wheel 4 comprises sheet metal blades 19 and the turbine wheel 5 comprises sheet metal blades 16 which are so riveted in the sheet metal shell 17 that its rivet extension pieces 18 pass through corresponding apertures in the sheet metal shell 17 and are riveted there. The impeller 32 is produced in the usual way, as a casting. The invention and the way it functions can of course also be applied in the case of a turbine wheel which is produced as a casting. In the space between the bottom wall 29 of the housing part 3 and the sheet metal shell 17, there is a bridging coupling 2 and a torsion spring arrangement 9. The bridging coupling 2 comprises a piston 7 which is substantially adapted to the inner contours of the bottom wall 29; it has on its outside diameter a friction surface 8 which can be applied against the housing part 3. In its radially inner portion, the piston 7 is guided for axial displacement on and is sealed in respect of the hub 6. Between the piston 7 and the sheet metal shell 17 is the torsion spring arrangement 9. It consists of a hub disc 11 and at least one cover plate 13 disposed on each side of the hub disc 11, these components comprising apertures to accommodate springs 10. In the present case, the two cover plates 13 are, radially outside the spring arrangement, riveted to the piston 7 via joined-together fixing zones 31 (FIG. 2). The radially inner portion of the hub disc 11, inside the disposition circle of the springs 10, is fitted on an angled ring 21 via teeth 15 in rotationally rigid but axially displaceable manner, the angled ring 21 being connected rigidly to the hub 6. Radially outside the disposition circle of the springs 10, the hub disc 11 has arms 12 (FIG. 3) which pass through cut-outs 14 in the cover plates 13, an auxiliary gyratory mass 22 being riveted onto these arms 12. In the present case, rivet extension pieces are provided which are disposed on and are in one piece with the arms 12. FIGS. 2 and 3 show the disposition of the cut-outs 14 or arms 12 as well as the apertures 27, 28 to accommodate the springs 10. The auxiliary mass is constructed as a closed ring and is inserted into the space which, in axial longitudinal section, is substantially triangular and which is defined by the sheet metal shell 17 of the turbine wheel 5, the substantially cylindrical side wall 30 of the housing part 3 and the radially outer zone of the piston 7. In operation, all parts are able to rotate about one axis 25 which coincides with the axis of rotation of the crank shaft of the internal combustion engine.

Figure 1:
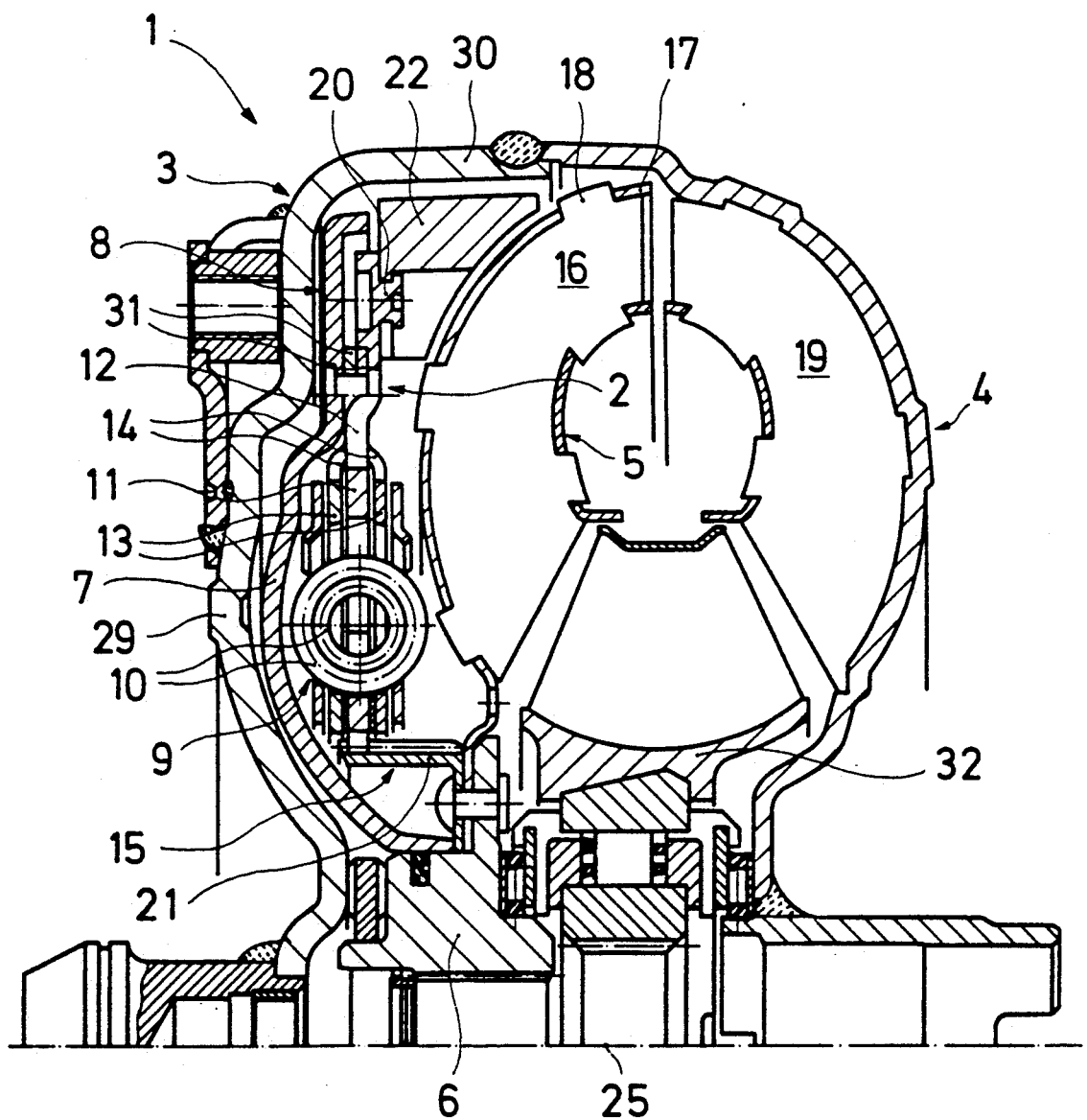
FIG. 1 shows the upper half of a longitudinal section through a hydrodynamic torque convertor with a bridging coupling and an auxiliary gyratory mass.
Figure 2:
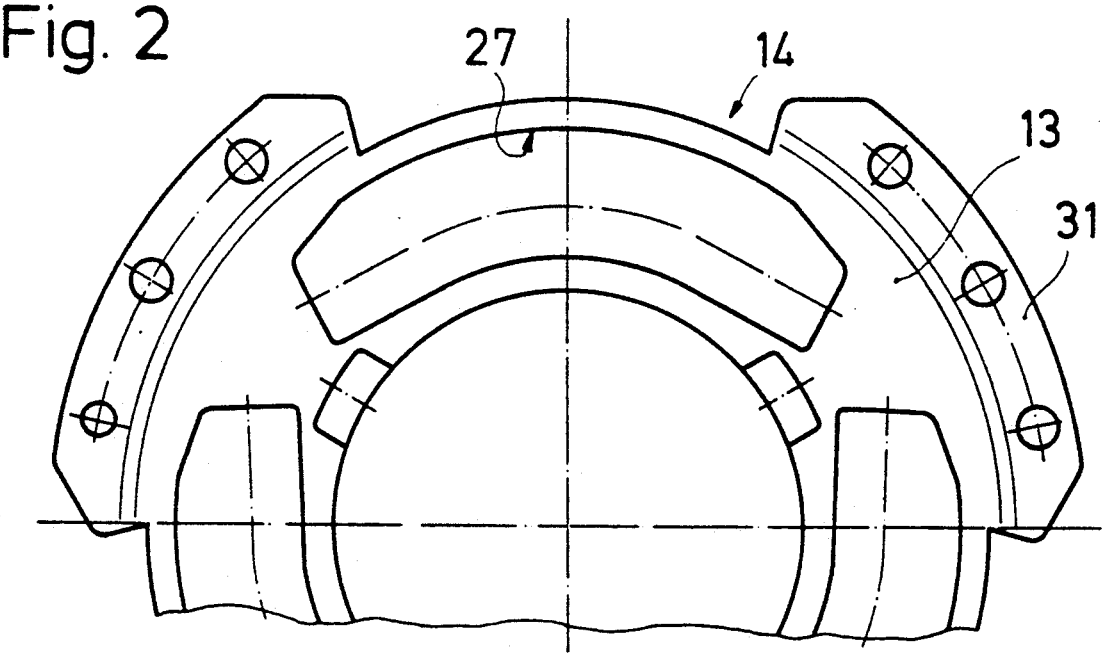
FIGS. 2 and 3 are partial views of a side plate and of a hub disc of the torsion spring arrangement.
Figure 3:
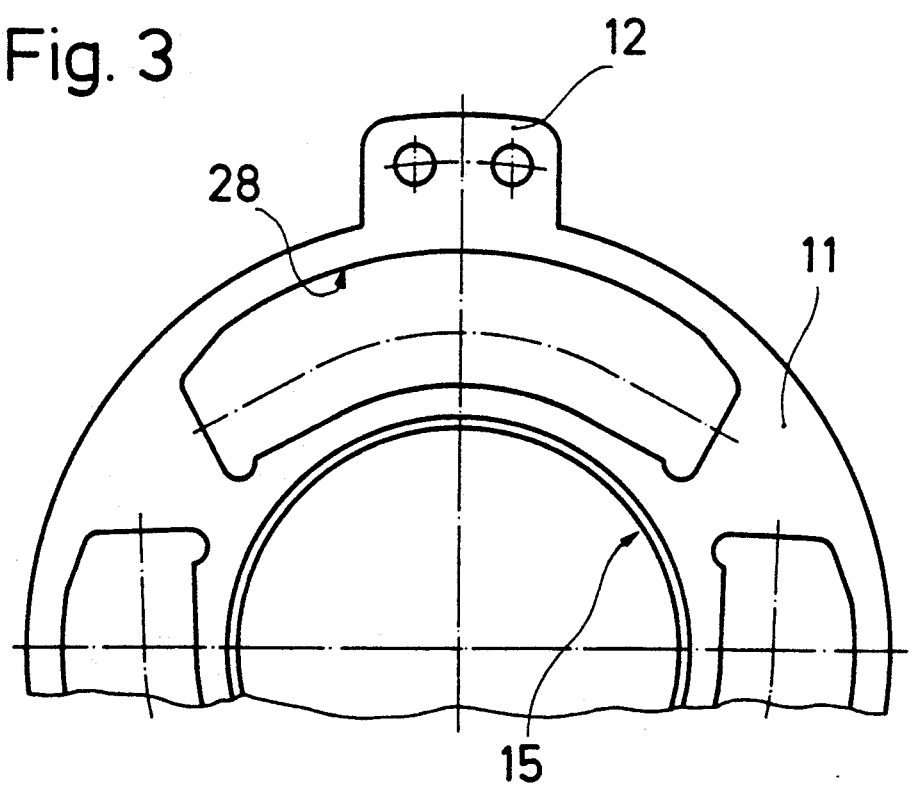

The torque convertor functions in the following way:

The housing part 3 with the pump wheel 4 is driven by the crank shaft of the internal combustion engine. In convertor operation, the torque is transmitted by the convertor fluid to the turbine wheel 5 and from there via the hub 6 to the gear shaft, not shown. To save fuel, in certain operating situations, the bridging coupling 2 is closed so that the torque is no longer transmitted via the convertor fluid but via the torsion spring arrangement 9, likewise to the hub 6. In this operating situation, the torsion spring arrangement 9—possibly with suitable friction means—is required to take over the vibration-related balancing out of drive and output. This vibration-related balancing is, by virtue of the auxiliary gyratory mass, also effective at lower rotary speeds than hitherto. The auxiliary mass is disposed in the power path behind the torsion spring arrangement 9 and in the present case the auxiliary mass 22 is rigidly connected to the output part of the torsion spring arrangement 9, namely to the hub disc 11 which is rotationally rigidly connected to the hub 6 via teeth 15.

As FIGS. 4 and 5 show, however, it is also possible for the auxiliary gyratory mass 23, 24 to be fixed directly on the turbine wheel 5.

In the case of the arrangement shown in FIG. 4, the auxiliary gyratory mass 23 is welded directly onto the sheet metal shell 17. In accordance with FIG. 5, the auxiliary mass 24 is riveted to the turbine wheel 5 via shaped sheet metal parts 26. For this purpose, in a particularly advantageous manner, the already existing rivet extension pieces 18 on the sheet metal blades 16 are lengthened somewhat and pass through corresponding apertures both in the sheet metal shell 17 and also in the shaped sheet metal part 26, connecting all three components by being peened over.

While specific embodiments of the invention have been shown and described in detail to illustrate the application of the inventive principles, it will be understood that the invention may be embodied otherwise without departing from such principles.

What I claim is:

1. A hydrodynamic torque convertor, comprising an approximately pot-shaped housing part (3) rotatingly driven about an axis of rotation (25) and comprising a bottom wall (29) and a side wall (30), a pump wheel (4) connected to the side wall (30) of the housing part (3) and masking the housing part (3), a turbine wheel (5) rotatable about the axis of rotation (25) in relation to the pump wheel (4) and disposed axially between the bottom wall (29) and the pump wheel (4), with a hub (6) coupled to an output shaft, a bridging coupling (2) disposed axially between the bottom wall (29) and the turbine wheel (5) with an axially movable piston (7) frictionally applied to the bottom wall (29), a torsion spring arrangement (9) with an input part (13) connected in rotationally elastic fashion to the input part (13) and connected to the hub (6), and an additional gyrating mass (22, 23, 24) on a component which is rotationally rigidly coupled to the output part (11) of the torsion spring arrangement (90), the torsion spring arrangement (9) has disposed in a circle springs (10) which couple the output part (11) in rotationally elastic fashion to the input part (13), and wherein the additional gyrating mass (22, 23, 24) is disposed relative to the axis of rotation (25) substantially radially outside the circle of disposition of the springs (10).

2. A torque convertor according to claim 1, wherein the side wall (30) of the housing part (3), of the turbine wheel (5) and of the region (8) of the piston (7) which bears frictionally on the bottom wall (29) form an annular space which widens out towards the side wall (30) and in which the additional gyrating mass (22, 23, 24) is disposed.

3. A torque convertor according to claim 2, wherein the additional gyrating mass (22, 23, 24) is constructed as a closed ring which has an approximately cylindrical outer periphery and of which the side which is towards the turbine wheel (5) is shaped to match an adjacent contour of the turbine wheel (5).

4. A torque convertor according to claim 2, wherein the additional gyrating mass (23, 24) is directly connected to the turbine wheel (5).

5. A torque convertor according to claim 4, wherein the turbine wheel (5) has a shell (17) made from sheet metal and blades (16) which are made from sheet metal and which are inserted into the shell (17) and wherein the additional gyrating mass (23) is welded directly onto the shell (17).

6. A torque convertor according to claim 4, wherein the turbine wheel (5) comprises a shell (17) made from sheet metal and, inserted into the shell (17), blades (16) which are made from sheet metal and wherein there is riveted onto the turbine wheel (5) at least one retaining element (26) on which the additional gyrating mass (24) is fixed.

7. A torque convertor according to claim 6, wherein the retaining element (26) is constructed as a shaped sheet metal component.

8. A torque convertor according to claim 7, wherein the blades (16) have rivet extensions (18) which pass through both the shell (17) and also through the sheet metal shaped part, supporting the blades (16) on the shell (17) together with the sheet metal shaped part.

9. A torque convertor according to claim 4, wherein the additional gyrating mass is cast in one piece on the shell of the turbine wheel (5).

10. A torque convertor according to claim 2, wherein the additional gyratory mass (22) is supported on the output part (11) of the torsion spring arrangement (9).

11. A torque convertor according to claim 10, wherein the torsion spring arrangement (9) comprises a hub disc (12) and two, disposed on axially opposite sides of the hub disc (11), side discs (13) which are rotationally elastically coupled to the hub disc (11) via a plurality of springs (10) which are disposed on a circle, the two side discs (13) being, radially outside the circle of the springs (10), rotationally rigidly connected to the piston (7), the hub disc (11) being rotationally rigidly but axially movably coupled to the hub (6) of the turbine wheel (5) radially within the circle of disposition via teeth (15), and wherein the hub disc (11) comprises a plurality of peripherally offset approximately radially projecting arms (12) which extend through recesses (14) on at least one of the side plates (13) and which carry the additional gyratory mass (22).

12. A torque convertor according to claim 11, wherein the side discs (13) are fixed on the piston (7) via a plurality of peripherally spaced apart common fixing areas (31), and wherein the recesses (14) through which the arms (12) pass are provided between the fixing areas (31).

* * * * *